(12) United States Patent
Maynard et al.

(10) Patent No.: US 9,292,835 B2
(45) Date of Patent: Mar. 22, 2016

(54) DETERMINING COMMUNICATION RECIPIENT AVAILABILITY

(75) Inventors: Nicholas Christopher Maynard, Southampton (GB); Simon Edward Burns, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 13/174,696

(22) Filed: Jun. 30, 2011

(65) Prior Publication Data

US 2013/0007146 A1    Jan. 3, 2013

(51) Int. Cl.
G06Q 10/10    (2012.01)

(52) U.S. Cl.
CPC .................................. *G06Q 10/107* (2013.01)

(58) Field of Classification Search
USPC ......................................................... 709/206
See application file for complete search history.

(56) References Cited

U.S. PATENT DOCUMENTS

| | | | |
|---|---|---|---|
| 2002/0099777 A1* | 7/2002 | Gupta et al. | 709/206 |
| 2006/0069580 A1 | 3/2006 | Mason et al. | |
| 2006/0195587 A1 | 8/2006 | Cadiz et al. | |
| 2008/0104175 A1 | 5/2008 | Keohane et al. | |
| 2008/0244011 A1* | 10/2008 | Cox et al. | 709/206 |
| 2009/0113001 A1 | 4/2009 | Manning et al. | |
| 2009/0259723 A1 | 10/2009 | Roic et al. | |
| 2010/0091959 A1* | 4/2010 | Miki et al. | 379/88.17 |
| 2010/0161743 A1* | 6/2010 | Krishnamurthi et al. | 709/206 |
| 2010/0223341 A1* | 9/2010 | Manolescu et al. | 709/206 |

OTHER PUBLICATIONS

IBM, http://www.ip.com/pubview/IPCOM000179958D, dated Mar. 3, 2009, downloaded Jun. 9, 2011, pp. 1-2.
IBM, http://www.ip.com/pubview/IPCOM000032962D, dated Nov. 19, 2004, downloaded Jun. 9, 2011, pp. 1.
IBM, TDB, Salahshour et al., http:www.ip/com/pubview/IPCOM000106875D, downloaded Jun. 9, 2011, pp. 143-144.

* cited by examiner

*Primary Examiner* — Natisha Cox
(74) *Attorney, Agent, or Firm* — Holland & Knight LLP; Brian J. Colandreo, Esq.; Jeffrey T. Placker, Esq.

(57) ABSTRACT

A method, computer program product, and system for determining communication recipient availability is described. A method may comprise receiving, via one or more computing devices, an indication that there is an intended recipient of a communication. The method may further comprise, in response to receiving the indication that there is the intended recipient of the communication, determining, via the one or more via one or more computing devices, if the intended recipient is available enough to receive the communication based upon, at least in part, one or more registries of availability, a communication type associated with the communication, and one or more user-defined parameters for the communication type. The method may also comprise, in response to determining, via the one or more via one or more computing devices, that the intended recipient is not available enough to receive the communication, suggesting one or more additional recipients to receive the communication.

14 Claims, 5 Drawing Sheets

| Availability Registry for Jon Miller | | |
|---|---|---|
| Communication Type: | Availability: | |
| Email | 3 days | ← 412 |
| Instant Message | 3 days | ← 414 |
| Text Message | 2 hours | ← 416 |
| Voice | 2 hours | ← 418 |
| Work Assignment | 3 days | ← 420 |

400 — (table); 402, 404, 406, 408, 410 point to Communication Type rows.

FIG. 4

DETERMINING COMMUNICATION RECIPIENT AVAILABILITY

BACKGROUND OF THE INVENTION

Communications such as emails and/or instant messages may be sent to recipients that are unable to receive them in a reasonable amount of time. These recipients may be busy, on vacation, or no longer with an organization through which the communication is sent. Often times users may have to send their communications to other recipients if the originally intended recipient does not receive the communication in a reasonable amount of time. As such, time may be wasted if users are unable to have knowledge about the availability of recipients.

BRIEF SUMMARY OF THE INVENTION

In an embodiment, a method may include receiving, via one or more computing devices, an indication that there is an intended recipient of a communication. The method may further include, in response to receiving the indication that there is the intended recipient of the communication, determining, via the one or more via one or more computing devices, if the intended recipient is available enough to receive the communication based upon, at least in part, one or more registries of availability, a communication type associated with the communication, and one or more user-defined parameters for the communication type. The method may also include, in response to determining that the intended recipient is not available enough to receive the communication, suggesting, via the one or more via one or more computing devices, one or more additional recipients to receive the communication.

One or more of the following features may be included. The method may include creating the one or more registries of availability based upon, at least in part, an analysis of one or more of a calendar, an out-of-office agent, an address book, twitter, a location service, and a vacation planner associated with the intended recipient. The method may also include updating the one or more registries of availability based upon, at least in part, an analysis of one or more of a calendar, an out-of-office agent, an address book, twitter, a location service, and a vacation planner associated with the intended recipient. Further, the method may include determining if the intended recipient is available enough to receive the communication before sending the communication.

In an implementation, the communication type associated with the communication may be at least one of: an email communication, an instant message communication, a text message communication, a voice communication, and a work-assignment communication. The one or more additional recipients to receive the communication may be determined based upon, at least in part, at least one of: an organizational hierarchy, and a corporate directory. The one or more additional recipients to receive the communication may be determined based upon, at least in part, one or more additional recipients designated by the intended recipient. The one or more user-defined parameters for the communication type may include, at least in part, a minimum amount of time acceptable for a communication of the communication type to be received by the intended recipient after it is sent.

In an embodiment, a computer program product may reside on a computer readable storage medium and may have a plurality of instructions stored on it. When executed by a processor, the instructions may cause the processor to perform operations including receiving an indication that there is an intended recipient of a communication. The operations may further include, in response to receiving the indication that there is the intended recipient of the communication, determining if the intended recipient is available enough to receive the communication based upon, at least in part, one or more registries of availability, a communication type associated with the communication, and one or more user-defined parameters for the communication type. The operations may also include, in response to determining that the intended recipient is not available enough to receive the communication, suggesting one or more additional recipients to receive the communication.

One or more of the following features may be included. The operations may include creating the one or more registries of availability based upon, at least in part, an analysis of one or more of a calendar, an out-of-office agent, an address book, twitter, a location service, and a vacation planner associated with the intended recipient. The operations may also include updating the one or more registries of availability based upon, at least in part, an analysis of one or more of a calendar, an out-of-office agent, an address book, twitter, a location service, and a vacation planner associated with the intended recipient. Further, the operations may include determining if the intended recipient is available enough to receive the communication before sending the communication.

In an implementation, the communication type associated with the communication may be at least one of: an email communication, an instant message communication, a text message communication, a voice communication, and a work-assignment communication. The one or more additional recipients to receive the communication may be determined based upon, at least in part, at least one of: an organizational hierarchy, and a corporate directory. The one or more additional recipients to receive the communication may be determined based upon, at least in part, one or more additional recipients designated by the intended recipient. The one or more user-defined parameters for the communication type may include, at least in part, a minimum amount of time acceptable for a communication of the communication type to be received by the intended recipient after it is sent.

In an embodiment, a computing system is provided. The computing system may include at least one processor and at least one memory architecture coupled with the at least one processor. The computing system may also include a first software module executable by the at least one processor and the at least one memory architecture, wherein the first software module may be configured to receive an indication that there is an intended recipient of a communication. Further, the computing system may include a second software module which may be configured to, in response to receiving the indication that there is the intended recipient of the communication, determine if the intended recipient is available enough to receive the communication based upon, at least in part, one or more registries of availability, a communication type associated with the communication, and one or more user-defined parameters for the communication type. Additionally, the computing system may include a third software module which may be configured to in response to determining that the intended recipient is not available enough to receive the communication, suggest one or more additional recipients to receive the communication.

One or more of the following features may be included. The computing system may include a fourth software module which may be configured to create the one or more registries of availability based upon, at least in part, an analysis of one or more of a calendar, an out-of-office agent, an address book, twitter, a location service, and a vacation planner associated with the intended recipient. Moreover, the computing system may include a fifth software module which may be configured to update the one or more registries of availability based upon, at least in part, an analysis of one or more of a calendar, an out-of-office agent, an address book, twitter, a location service, and a vacation planner associated with the intended recipient. Further, the computing system may include a sixth software module which may be configured to determine if the intended recipient is available enough to receive the communication before sending the communication.

In an implementation, the communication type associated with the communication may be at least one of: an email communication, an instant message communication, a text message communication, a voice communication, and a work-assignment communication. The one or more additional recipients to receive the communication may be determined based upon, at least in part, at least one of: an organizational hierarchy, and a corporate directory. The one or more additional recipients to receive the communication may be determined based upon, at least in part, one or more additional recipients designated by the intended recipient. The one or more user-defined parameters for the communication type may include, at least in part, a minimum amount of time acceptable for a communication of the communication type to be received by the intended recipient after it is sent.

In an embodiment, a method may include receiving, via one or more computing devices, an indication that there is an intended recipient of a communication. The method may further include, in response to receiving the indication that there is the intended recipient of the communication, determining, via the one or more via one or more computing devices, if the intended recipient is available enough to respond to the communication based upon, at least in part, one or more registries of availability, a communication type associated with the communication, and one or more user-defined parameters for the communication type. The method may also include, in response to determining that the intended recipient is not available enough to respond to the communication, suggesting, via the one or more via one or more computing devices, one or more additional recipients to receive the communication.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

FIG. 4 is a registry which may be associated with the communication recipient availability process content process of FIG. 1.

DETAILED DESCRIPTION OF THE INVENTION

Figure 1:
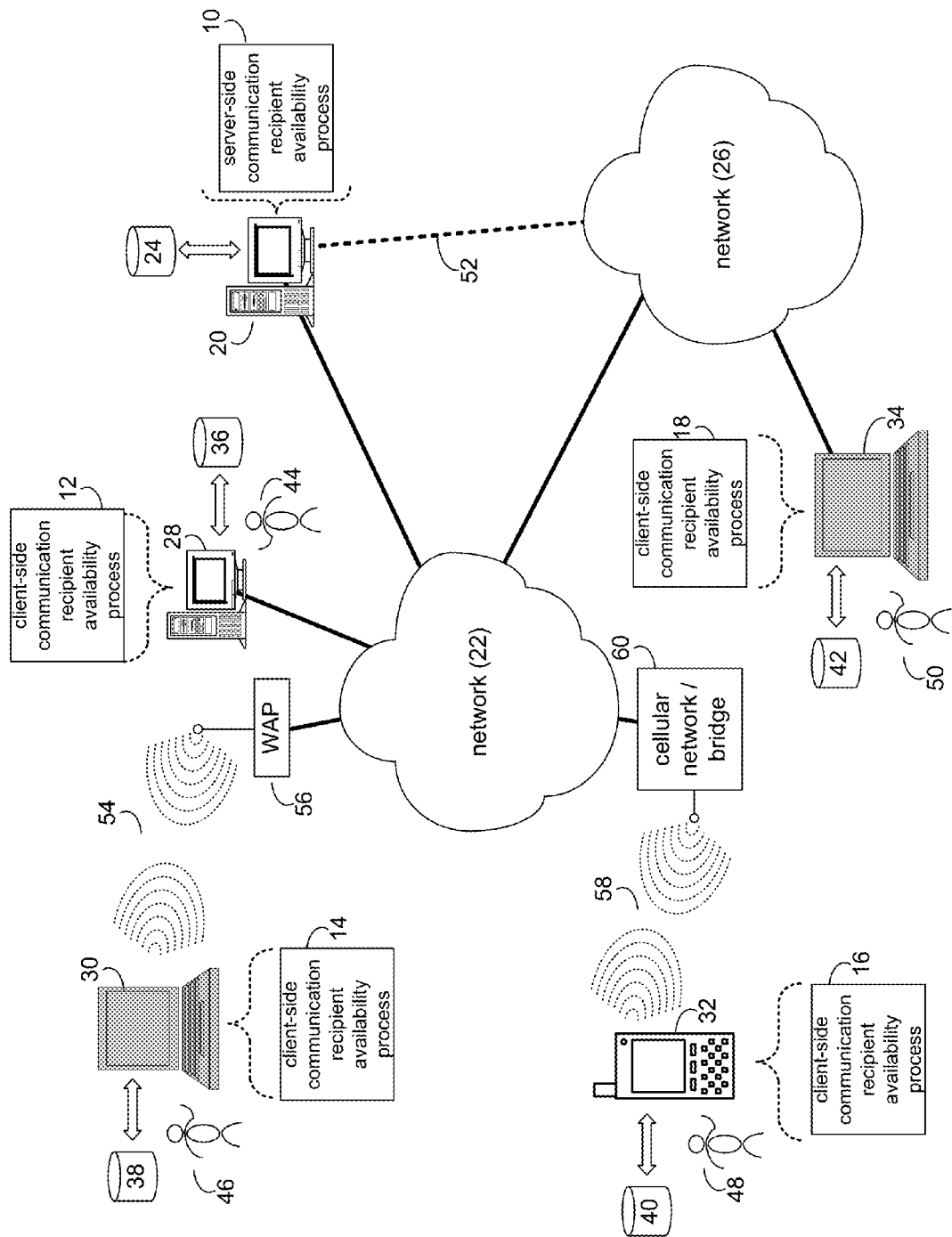
FIG. 1 is a diagrammatic view of a communication recipient availability process coupled to a distributed computing network.
Figure 2:
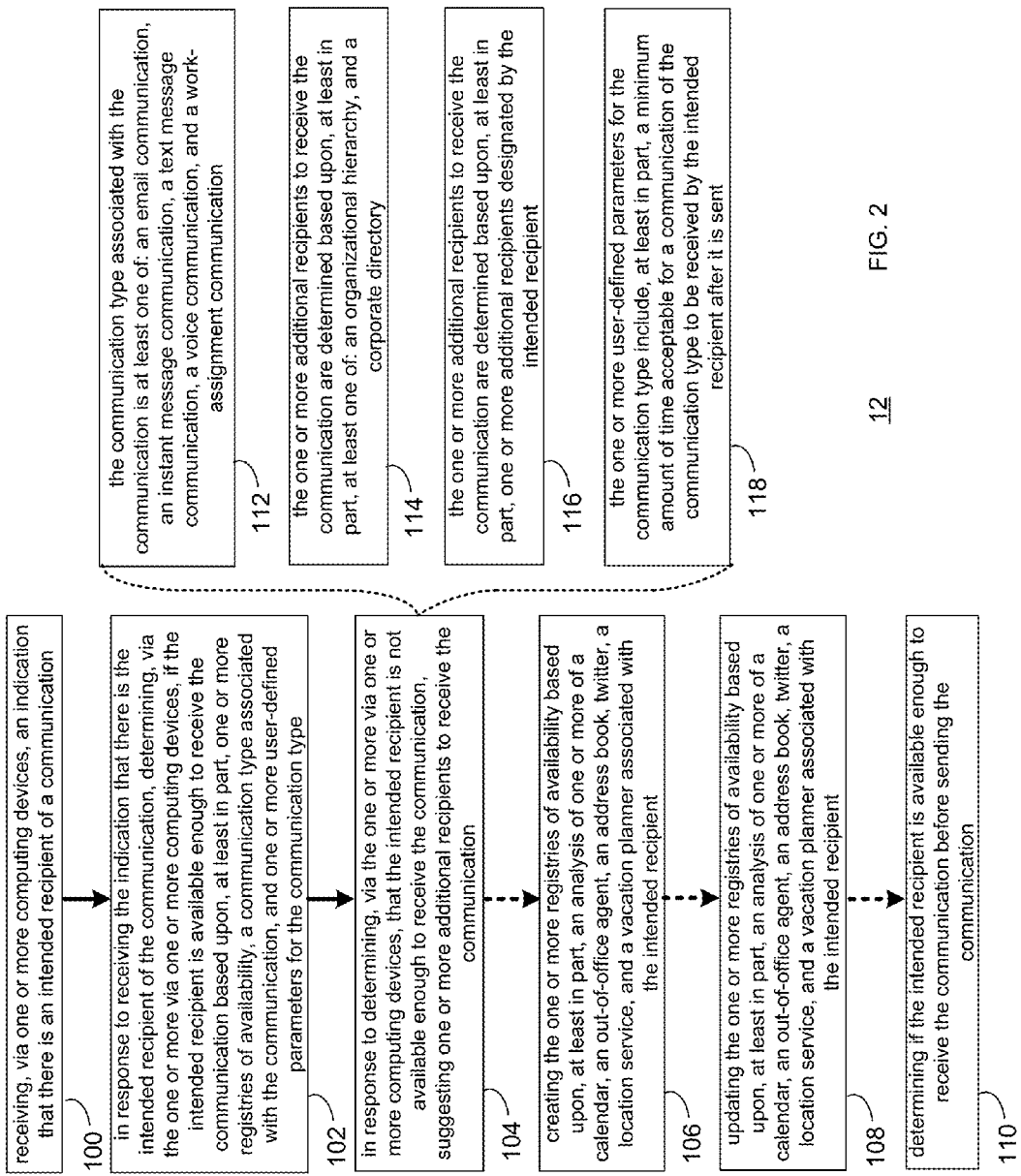
FIG. 2 is a flowchart of the communication recipient availability process of FIG. 1.

Referring to FIGS. 1 & 2, there is shown an communication recipient availability process 10. As will be discussed below, communication recipient availability process 12 may receive 100 an indication that there is an intended recipient of a communication. Communication recipient availability process 12 may also, in response to receiving the indication that there is the intended recipient of the communication, determining 102 if the intended recipient is available enough to receive the communication based upon, at least in part, one or more registries of availability, a communication type associated with the communication, and one or more user-defined parameters for the communication type. Communication recipient availability process 12 may additionally, in response to determining that the intended recipient is not available enough to receive the communication, suggest 104 one or more additional recipients to receive the communication.

Communication recipient availability (CRA) process may be a server-side process (e.g., server-side CRA process 10), a client-side process (e.g., client-side CRA process 12, client-side CRA process 14, client-side CRA process 16, or client-side CRA process 18), or a hybrid server-side/client-side process (e.g., the combination of server-side CRA process 10 and one or more of client-side CRA processes 12, 14, 16, 18).

Server-side CRA process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example.

The instruction sets and subroutines of server-side CRA process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side CRA processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CE®, Red Hat® Linux®, or a custom operating system.

The instruction sets and subroutines of client-side CRA processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side CRA processes 12, 14, 16, 18 and/or server-side CRA process 10 may be processes that run within (i.e., are part of) an email application, such as, for example, Microsoft® Outlook® and/or a unified communications application such as, for example, Lotus® Sametime®. Alternatively, client-side CRA processes 12, 14, 16, 18 and/or server-side CRA process 10 may be stand-alone applications that work in conjunction with the email application. One or more of client-side CRA processes 12, 14, 16, 18 and server-side CRA process 10 may interface with each other (via network 22 and/or network 26).

Users 44, 46, 48, 50 may access server-side CRA process 10 directly through the device on which the client-side CRA process (e.g., client-side CRA processes 12, 14, 16, 18) is executed, namely client electronic devices 28, 30, 32, 34, for example. Users 44, 46, 48, 50 may access server-side CRA process 10 directly through network 22 and/or through secondary network 26. Further, server computer 20 (i.e., the computer that executes server-side CRA process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Communication Recipient Availability (CRA) Process

For the following discussion, client-side CRA process 12 will be described for illustrative purposes. It should be noted that client-side CRA process 12 may interface with server-side CRA process 10 and may be executed within one or more applications that allow for communication with client-side CRA process 12. However, this is not intended to be a limitation of this disclosure, as other configurations are possible (e.g., stand-alone, client-side CRA processes and/or stand-alone server-side CRA processes.) For example, some implementations may include one or more of client-side CRA processes 14, 16, 18 in place of or in addition to client-side CRA process 12.

Figure 3:
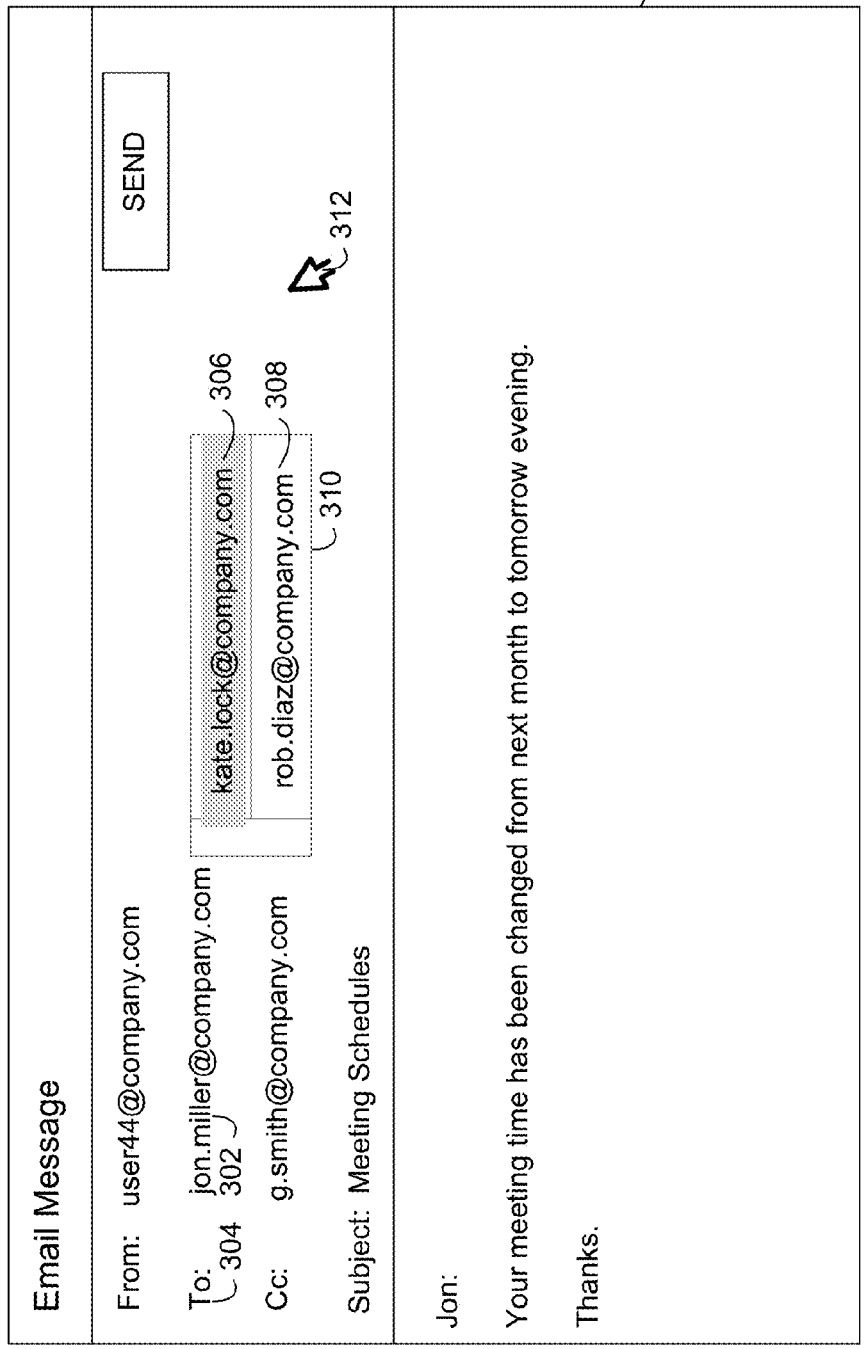
FIG. 3 is an email message which may be associated with communication recipient availability process of FIG. 1.

Referring now to FIGS. 1-3, CRA process 12 may receive 100 an indication that there is an intended recipient (e.g., intended recipient 302) of a communication (e.g., email message 300). The communication (e.g., email message 300) may be created via an email application, such as, for example, Microsoft® Outlook® and/or a unified communications application such as, for example, Lotus® Sametime®. Email message 300 may also be created via a web-based email application. For example user 44 may enter an email address (i.e., "jon.miller@company.com"), or name, into "To:" field 304 of email message 300. CRA process 12 may detect that user 44 is entering an email address or name into "To:" field 304. As such, the action of user 44 entering the email address or name into "To:" field 304 may be the indication that there is an intended recipient (e.g., intended recipient 302) of a communication (e.g., email message 300).

Figure 5:
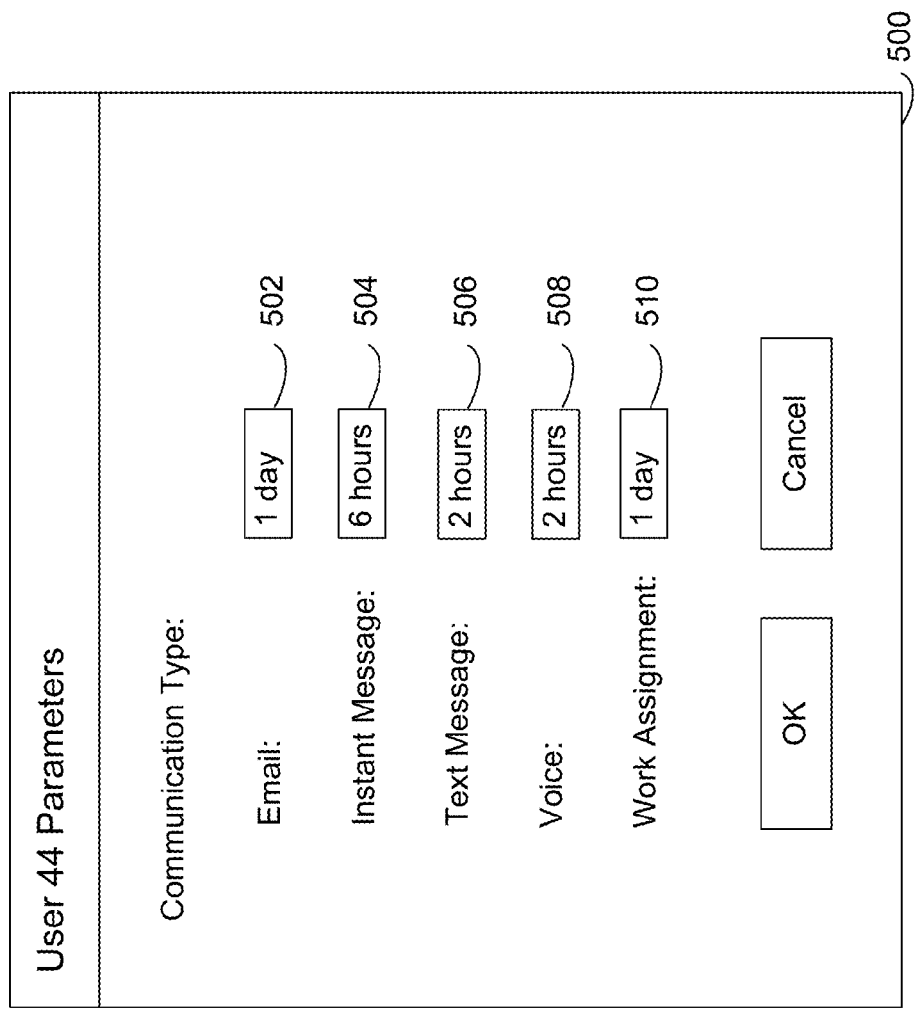
FIG. 5 is an graphical user interface which may be associated with communication recipient availability process of FIG. 1.

Continuing with the example above, and referring now also to FIGS. 4-5, CRA process 12 may, in response to receiving the indication that there is the intended recipient (e.g., intended recipient 302) of the communication (e.g., email message 300), determine 102 if the intended recipient (e.g., intended recipient 302) is available enough to receive and/or respond to the communication (e.g., email message 300) based upon, at least in part, one or more registries of availability (e.g., registry 400), a communication type (e.g., email, instant message, text message, voice, work assignment communication) associated with the communication (e.g., email message 300), and one or more user-defined parameters (e.g., parameters 502, 504, 506, 508, 510) for the communication type. While email message 300 and email as a communication type will be referred to herein for exemplary purposes, this is not intended to be a limitation of the present disclosure, as CRA process 12 may be configured to operate in connection with various other communication types and applications in which communications may be created and exchanged. For example, the communication type associated with the communication may be (112) at least one of: an email communication (e.g., communication type 402), an instant message communication (e.g., communication type 404), a text message communication (e.g., communication type 406), a voice communication (e.g., communication type 408), and a work-assignment communication (e.g., communication type 410). A work assignment communication may be associated with an application that may allow, for example, a manager to assign work to a subordinate through an electronic communication. A work assignment communication may be, for example, a "to-do" communication as available in, for example, Lotus® Connections.

CRA process 12 may create 106 registry 400 (i.e., a registry of availability) based upon, at least in part, an analysis of one or more of a calendar, an out-of-office agent, an address book, a Twitter™ account, a location service, and a vacation planner associated with the intended recipient (e.g., intended recipient 302). While registry 400 is shown as a registry for Jon Miller, this is for exemplary purposes only and not intended to be a limitation of the present disclosure. For example, registry 400 may be an aggregated registry that includes availability information for a plurality of users who may be intended recipients. Registry 400 may include a determined availability (e.g., availability 412, 414, 416, 418, and/or 420) for an intended recipient (e.g., intended recipient 302 or Jon Miller) for each of the one or more communication types (e.g., communication types 402-410). CRA process 12 may, for example, pull information from one or more of a calendar, an out-of-office agent, an address book, a Facebook™ account, Twitter™ account, a location service, and a vacation planner associated with intended recipient 302 in order to determine availabilities 412-420 of intended recipient 302 corresponding to each communication type (e.g., communication types 402-410). In an implementation one or more of the calendar, the out-of-office agent, the address book, the Facebook™ account, the Twitter™ account, the location service, and the vacation planner associated with intended recipient 302 may have a corresponding registry kept by CRA process 12 for intended recipient 302.

Assume for exemplary purposes that one or more of a calendar, an out-of-office agent, an address book, a Facebook™ account, Twitter™ account, a location service, and a vacation planner associated with Jon Miller includes information indicating that Jon Miller will be on vacation for 3 days without access to email. CRA process 12 may pull relevant information from the calendar, etc., as discussed above, and may determine that Jon Miller may not be able (i.e., may not be available enough) to access (i.e., receive) his email for 3 days, as shown by availability 412. Further, based upon information that CRA process 12 may gather from the calendar, etc., as discussed above, CRA process 12 may also determine that Jon Miller may not be able (i.e., may not be available enough) to respond to his email for at least 3 days. CRA process 12 may also update 108 the one or more registries of availability (e.g., registry 400) based upon, at least in part, an analysis of one or more of a calendar, an out-of-office agent, an address book, Twitter™, a location service, and a vacation planner associated with the intended recipient (intended recipient 302).

The one or more user-defined parameters (e.g., parameters 502, 504, 506, 508, 510) for the communication type (e.g., communication types 402-410) may be defined by a user (e.g., user 44) drafting a communication (e.g., email message 300) via a graphical user interface (GUI) (e.g., GUI 500). The GUI may be available from an email application, such as, for example, Microsoft® Outlook®, and/or a unified communications application such as, for example, Lotus® Sametime®. For example, user 44 may enter a minimum amount of time that may be acceptable for communications of each of the communication types (e.g., communication types 402-410) to be received by the intended recipient (e.g., intended recipient 302). If user 44 wishes that intended recipients (e.g., intended recipient 302) receive email sent by user 44 in "1 day", user 44 may enter "1 day" as parameter 502. Likewise, user 44 may enter desired minimum amounts of time before which intended recipients (e.g., intended recipient 302) receive communications of each type, for example "6 hours" for parameter 504 (corresponding to instant messages), "2 hours" for parameter 506 (corresponding to text messages), "2 hours" for parameter 508 (corresponding to voice communications), and "1 day" for to parameter 510 (corresponding to work assignment communications). In this way, the one or more user-defined parameters (e.g., one or more of parameters 502, 504, 506, 508, 510) for the communication type (e.g., one or more of communication types 402-410) may include (118), at least in part, a minimum amount of time (e.g., one or more of parameters 502, 504, 506, 508, 510) acceptable for a communication (e.g., email message 300) of the communication type (e.g., one or more of communication types 402-410) to be received by the intended recipient (e.g., intended recipient 302) after it is sent.

Further, in an implementation, one or more of parameters 502, 504, 506, 508, 510 may correspond to a minimum amount of time that may be acceptable for the intended recipient (e.g., intended recipient 302) to respond to a communication of that type. For example, user 44 may enter a minimum amount of time that may be acceptable for communications of each of the communication types (e.g., communication types 402-410) to be responded to by the intended recipient (e.g., intended recipient 302). If user 44 wishes that intended recipients (e.g., intended recipient 302) respond to the email sent by user 44 in "1 day", user 44 may enter "1 day" as parameter 502. Likewise, user 44 may enter desired minimum amounts of time before which intended recipients (e.g., intended recipient 302) are to respond to communications of each type, for example "6 hours" for parameter 504 (corresponding to instant messages), "2 hours" for parameter 506 (corresponding to text messages), "2 hours" for parameter 508 (corresponding to voice communications), and "1 day" for to parameter 510 (corresponding to work assignment communications). In this way, the one or more user-defined parameters (e.g., one or more of parameters 502, 504, 506, 508, 510) for the communication type (e.g., one or more of communication types 402-410) may include at least in part, a minimum amount of time (e.g., one or more of parameters 502, 504, 506, 508, 510) acceptable for a communication (e.g., email message 300) of the communication type (e.g., one or more of communication types 402-410) to be responded to by the intended recipient (e.g., intended recipient 302) after it is sent.

As discussed above, CRA process 12 may determine 102 if the intended recipient (e.g., intended recipient 302) is available enough to receive and/or respond to the communication (e.g., email message 300) based upon, at least in part, one or more registries of availability (e.g., registry 400), a communication type (e.g., email, instant message, text message, voice, work assignment communication) associated with the communication (e.g., email message 300), and one or more user-defined parameters (e.g., parameters 502, 504, 506, 508, 510) for the communication type. CRA process 12 may determine 110 if the intended recipient (e.g., intended recipient 302) is available enough to receive the communication (e.g., email message 300) before sending the communication (e.g., email message 300). For example, as user 44 enters "jon.miller@company.com" into "To:" field 304, CRA process 12 may pull information from registry 400 and one or more of parameters 502, 504, 506, 508, 510. Further, CRA process 12 may determine that, since intended recipient 302 (i.e., Jon Miller) is not likely to receive email message 300 for 3 days, and since user 44 wants email message 300 to be received in 1 day (e.g., as defined in parameter 502), that intended recipient 302 is not available enough to receive email message 300. In another example, if user 44 defined parameter 502 as 5 days, CRA process 12 may determine that intended recipient 302 is available enough to receive email message 300. If CRA process 12 determines that intended recipient 302 is available enough to receive email message 300, CRA process 12 may allow user 44 to continue drafting email message 300 and send email message 300 to intended recipient 302.

In an implementation, CRA process 12 may determine if the intended recipient (e.g., intended recipient 302) is available enough to respond to the communication (e.g., email message 300) before sending the communication (e.g., email message 300). For example, as user 44 enters "jon.miller@company.com" into "To:" field 304, CRA process 12 may pull information from registry 400 and one or more of parameters 502, 504, 506, 508, 510. Further, CRA process 12 may determine that, since intended recipient 302 (i.e., Jon Miller) is not likely to receive email message 300 for 3 days, and since user 44 wants email message 300 to be responded to in 1 day (e.g., as defined in parameter 502), that intended recipient 302 is not available enough to respond to email message 300. In another example, if user 44 defined parameter 502 as 5 days, CRA process 12 may determine that intended recipient 302 is available enough to respond to email message 300. If CRA process 12 determines that intended recipient 302 is available enough to respond to email message 300, CRA process 12 may allow user 44 to continue drafting email message 300 and send email message 300 to intended recipient 302.

CRA process 12 may also determine whether or not intended recipient 302 is available enough to respond to email message 300 by adding a user-defined about of time to the amount of time that CRA process 12 determines that it will take intended recipient 302 to receive email message 300. For example, CRA process 12 may determine that, since intended recipient 302 (i.e., Jon Miller) is not likely to receive email message 300 for 3 days, intended recipient 302 may be unlikely to be able to respond to email message 300 for 4 days. In other words, CRA process 12 may add a user-defined parameter of 1 day. Since user 44 wants email message 300 to be responded to in 1 day (e.g., as defined in parameter 502), CRA process 12 may determine that intended recipient 302 is not available enough to respond to email message 300. In another example, if user 44 defined parameter 502 as 5 days, CRA process 12 may determine that intended recipient 302 is available enough to respond to email message 300.

In response to determining that the intended recipient (e.g., intended recipient 302) is not available enough to receive and/or respond to the communication (e.g., email message 300), CRA process 12 may suggest 104 one or more additional recipients (e.g., additional recipients 306, 308) to receive the communication (e.g., email message 300). In an implementation, CRA process 12 may, in response to determining that the intended recipient (e.g., intended recipient 302) is not available enough to receive and/or respond to the communication (e.g., email message 300), render popup menu 310. Popup menu 310 may be rendered near "To:" field 304, or near an area in another communication application (e.g., an instant message application) configured for a user to enter an intended recipient, and may display additional recipients 306 and/or 308 as suggested by CRA process 12. User 44 may select, via, e.g., cursor 312, one or more of additional recipients 306 and/or 308 in place of or in addition to intended recipient 302.

The one or more additional recipients (e.g., additional recipients 306, 308) to receive the communication may be (114) determined based upon, at least in part, at least one of: an organizational hierarchy, and a corporate directory. For example, a corporation or other organization that employs user 44, intended recipient 302, and additional recipients 306 and/or 308 may have an organizational hierarchy and/or corporate directory including employee information. The employee information may include one or more of the employee's group, job title, manager, assistant, email address, phone number, user name, etc. In an implementation, if configured to do so, CRA process 12 may pull the intended recipient's (e.g., intended recipient 302) manager and/or assistant's email address from the organizational hierarchy and/or corporate directory and suggest the manager and/or assistant as an additional recipient.

Further, the one or more additional recipients (e.g., additional recipients 306, 308) to receive the communication (e.g., email message 300) may be 116 determined based upon, at least in part, one or more additional recipients (e.g., additional recipients 306, 308) designated by the intended recipient (e.g., intended recipient 302). For example, intended recipient 302 may select additional recipients 306 and/or 308 as additional recipients via a GUI provided by a communication application that intended recipient 302 uses. When a user (e.g., user 44) enters intended recipient 302 as an intended recipient in the communication application, CRA process 12 may, in response, provide the one or more additional recipients (e.g., additional recipients 306, 308) designated by intended recipient 302, if CRA process 12 determines that intended recipient 302 is not available enough to receive the communication. Further, if CRA process 12 determines that intended recipient 302 is not available enough to receive and/or respond the communication (e.g., email message 300), if CRA process 12 is unable to pull additional recipients from the organizational hierarchy and/or corporate directory, and if intended recipient 302 did not designate any additional recipients, CRA process 12 may provide a warning to user 44 indicating that intended recipient 302 is not available enough to receive the communication (e.g., email message 300).

It should be noted that while it has been discussed above that user 44 may be notified that intended recipient 302 is not available enough via a warning, this is not intended to be a limitation of the present disclosure. For example, user 44 may be notified in various ways that intended recipient 302 is not available enough, including, but not limited to: providing a status indictor near the intended recipient's entered email address or user name, or providing an icon next to the intended recipient's user name in an instant messaging application.

It should also be noted that, while email message 300 has been discussed above for exemplary purposes, this is not intended to be a limitation of the present disclosure, as CRA process 12 may be applied to any of the other communication types discussed above including, but not limited to, instant message communications. For example, user 44 may enter a user name an in instant messaging communication. Using one or more of the features described above, CRA process 12 may determine that the intended recipient associated with that user name is not available enough to receive the instant message communication based upon, at least in part, a registry associated with that intended recipient and parameter 414 defined by user 44. As such, CRA process 12 may suggest one or more additional recipients to receive the instant message communication using one or more of the features described above.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A computer program product residing on a non-transitory computer readable storage medium having a plurality of instructions stored thereon, which, when executed by a processor, cause the processor to perform operations comprising:
   receiving an indication that there is an intended recipient of a communication as a sender of the communication enters the intended recipient of the communication;
   as the sender enters the intended recipient of the communication, in response to receiving the indication that there is the intended recipient of the communication, automatically determining if the intended recipient is available enough to receive the communication based upon, at least in part, one or more registries of availability, a communication type associated with the communication, and one or more user-defined parameters for the communication type, the one or more user-defined parameters including a user-defined minimum amount of time acceptable for communications of each of a plurality of communication types to be received by the intended recipient, wherein determining if the intended recipient is available enough to receive the communication by the user-defined minimum amount of time occurs before the communication is sent to the intended recipient of the communication; and
   in response to determining that the intended recipient is not available enough to receive the communication, suggesting with a pop-up window, one or more additional recipients to receive the communication.

2. The computer program product of claim 1, further comprising:
creating the one or more registries of availability based upon, at least in part, an analysis of one or more of a calendar, an out-of-office agent, an address book, twitter, a location service, and a vacation planner associated with the intended recipient.

3. The computer program product of claim 1, further comprising:
updating the one or more registries of availability based upon, at least in part, an analysis of one or more of a calendar, an out-of-office agent, an address book, twitter, a location service, and a vacation planner associated with the intended recipient.

4. The computer program product of claim 1, wherein the communication type associated with the communication is at least one of: an email communication, an instant message communication, a text message communication, a voice communication, and a work-assignment communication.

5. The computer program product of claim 1, wherein the one or more additional recipients to receive the communication are determined based upon, at least in part, at least one of: an organizational hierarchy, and a corporate directory.

6. The computer program product of claim 1, wherein the one or more additional recipients to receive the communication are determined based upon, at least in part, one or more additional recipients designated by the intended recipient.

7. A computing system comprising:
at least one processor;
at least one memory architecture coupled with the at least one processor;
a first software module executable by the at least one processor and the at least one memory architecture, wherein the first software module is configured to receive an indication
that there is an intended recipient of a communication as a sender of the communication enters the intended recipient of the communication;
a second software module executable by the at least one processor and the at least one memory architecture, wherein the second software module is configured to, as the sender enters the intended recipient of the communication, in response to receiving the indication that there is the intended recipient of the communication, automatically determine if the intended recipient is available enough to receive the communication based upon, at least in part, one or more registries of availability, a communication type associated with the communication, and one or more user-defined parameters for the communication type, the one or more user-defined parameters including a user-defined minimum amount of time acceptable for communications of each of a plurality of communication types to be received by the intended recipient, wherein determining if the intended recipient is available enough to receive the communication by the user-defined minimum amount of time occurs before the communication is sent to the intended recipient of the communication; and
a third software module executable by the at least one processor and the at least one memory architecture, wherein the third software module is configured to, in response to determining that the intended recipient is not available enough to receive the communication, suggest with a pop-up window, one or more additional recipients to receive the communication.

8. The computing system of claim 7, further comprising:
a fourth software module executable by the at least one processor and the at least one memory architecture, wherein the fourth software module is configured to create the one or more registries of availability based upon, at least in part, an analysis of one or more of a calendar, an out-of-office agent, an address book, twitter, a location service, and a vacation planner associated with the intended recipient.

9. The computing system of claim 7, further comprising:
a fifth software module executable by the at least one processor and the at least one memory architecture, wherein the fifth software module is configured to update the one or more registries of availability based upon, at least in part, an analysis of one or more of a calendar, an out-of-office agent, an address book, twitter, a location service, and a vacation planner associated with the intended recipient.

10. The computing system of claim 7, wherein the communication type associated with the communication is at least one of: an email communication, an instant message communication, a text message communication, a voice communication, and a work-assignment communication.

11. The computing system of claim 7, wherein the one or more additional recipients to receive the communication are determined based upon, at least in part, at least one of: an organizational hierarchy, and a corporate directory.

12. The computing system of claim 7, wherein the one or more additional recipients to receive the communication are determined based upon, at least in part, one or more additional recipients designated by the intended recipient.

13. The computer program product of claim 1, further comprising:
in response to determining that the intended recipient is not available enough to receive the communication, providing an indication that the intended recipient is not available enough to receive the communication.

14. The computing system of claim 7, further comprising:
a sixth software module executable by the at least one processor and the at least one memory architecture, wherein the sixth software module is configured to, in response to determining that the intended recipient is not available enough to receive the communication, provide an indication that the intended recipient is not available enough to receive the communication.

* * * * *

UNITED STATES PATENT AND TRADEMARK OFFICE
CERTIFICATE OF CORRECTION

PATENT NO. : 9,292,835 B2  
APPLICATION NO. : 13/174696  
DATED : March 22, 2016  
INVENTOR(S) : Nicholas Christopher Maynard and Simon Edward Burns Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 377 days.

Signed and Sealed this
Fourteenth Day of June, 2016

Michelle K. Lee
*Director of the United States Patent and Trademark Office*